(No Model.)

O. S. CRAIN.
Feather Renovator.

No. 230,616. Patented Aug. 3, 1880.

Attest:
H. L. Perrine
A. M. Long

Inventor.
Orrin S. Crain.
By H. J. Abbot.
Atty.

UNITED STATES PATENT OFFICE.

ORRIS S. CRAIN, OF SHAWANO, WISCONSIN.

FEATHER-RENOVATOR.

SPECIFICATION forming part of Letters Patent No. 230,616, dated August 3, 1880.

Application filed May 20, 1880. (No model.)

*To all whom it may concern:*

Be it known that I, ORRIS S. CRAIN, a citizen of the United States, residing at Shawano, in the county of Shawano and State of Wisconsin, have invented certain new and useful Improvements in Feather-Renovators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
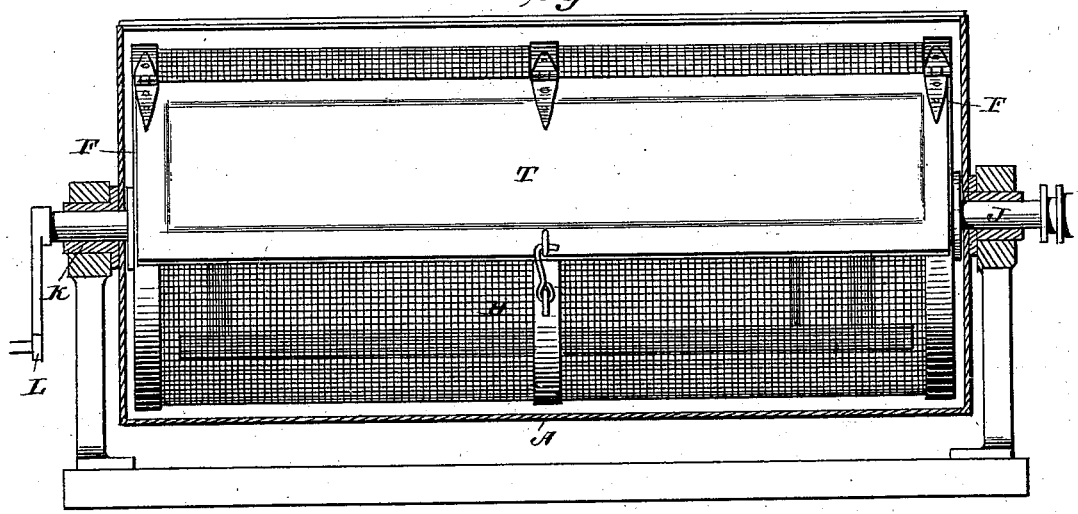
Figure 2:
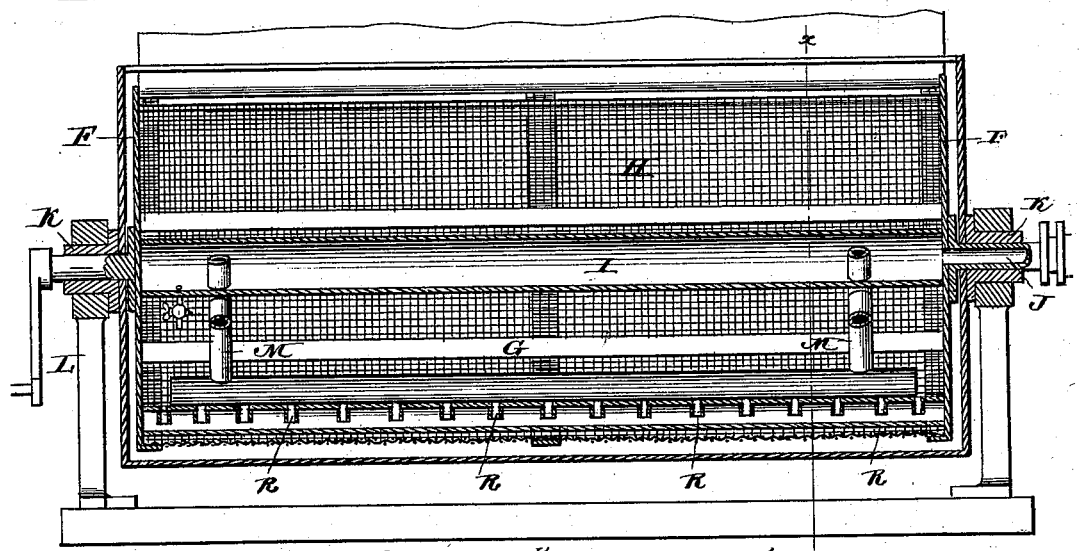
Figure 3:
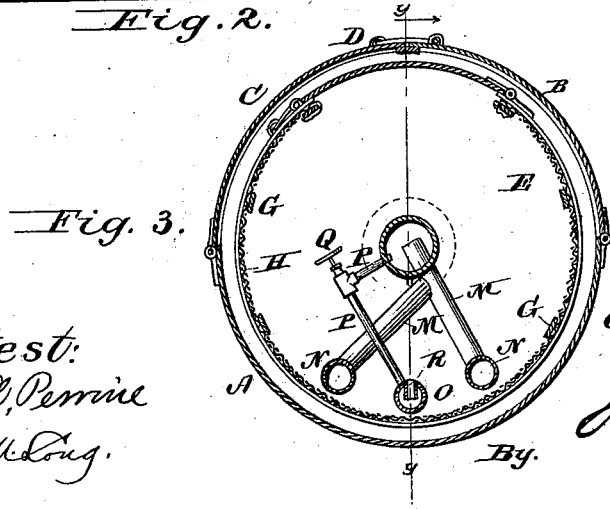

Figure 1 is a side elevation of the renovator, a section of the casing being removed. Fig. 2 is a vertical longitudinal section through the center of the renovator on the line $y\,y$ of Fig. 3; and Fig. 3, a transverse section taken on the line $x\,x$ of Fig. 2.

My invention relates to feather-renovators; and it consists in the construction and combination of parts, hereinafter fully described, and then set forth in the claims.

In the accompanying drawings, the letter A indicates a casing made with hinged sections B and C, which, when brought down, close the casing and are held together and closed by means of hooks D or otherwise. Within this chamber there is journaled a revolving cylinder or chamber, E, which consists of two ends, F, and longitudinal bars G, extending from end to end and at suitable distances apart. The frame thus formed is covered with wire-gauze H or other suitable perforated covering.

There extends centrally and longitudinally through the cylinder E a pipe, I, which communicates at one end with the hollow journal J, which projects from the cylinder through the outside casing, and has its bearing in the journal-box K of casing A. The other end of the pipe is closed and is supported against the other end of the cylinder, or in any other suitable manner. The journal of this end of the cylinder also projects through the casing A, and has its bearings in the journal-box K of the casing, and to the end which extends beyond the box a crank, L, is connected for the purpose of revolving the cylinder.

From the pipe I there extends a series of radial tubes, M, to the lower ends of which there are connected pipes N, which run parallel with pipe I. Any number of these radial tubes and parallel pipes may be employed.

The ends of the tubes which open into the main pipe I extend above the sides of the pipe, as shown, so that any water of condensation will not run from pipe I down the tubes into pipes N.

One or more pipes, O, which run the length of the cylinder, connect with pipe I through tubes P, which are provided with a valve, Q, so as to cut off steam from pipes O, which are perforated, so as to allow the escape of steam into cylinder E and among the feathers therein. The perforations in the pipes O are encircled inside of the pipes with a flange or tube, R, which is designed to prevent water of condensation running from the pipes through the perforations into the cylinder.

Both pipes, I and O, are provided with stop-cocks, through which the water of condensation may be withdrawn from the pipes.

Whatever water that may settle in pipes N from the condensation of steam may be run therefrom into pipes I through the communicating tubes, or the pipes may be provided with stop-cocks for the same purpose.

The pipes N and O are preferably located as shown in the drawings, as more satisfactory results follow than when otherwise located.

The cylinder E is provided with a hinged door, T, for the introduction and removal of the feathers to and from the cylinder.

In operation the doors to the outside casing and the cylinder are opened, and after the introduction of the feathers the doors are locked, the steam turned on, and the cylinder revolved. The steam, which is brought from any suitable generator, passes, under the control of a valve, through the hollow journal of cylinder E into pipe I, from whence a portion issues into the closed pipes and a portion into perforated pipes O, from whence it passes into the cylinder E, and disseminates itself through the feathers therein.

After the feathers have been subjected long enough to the action of the steam for the accomplishment of the desired end the steam is turned off from pipes O, but allowed to continue in pipes N, for the purpose of still further heating, and also for drying the feathers.

To assist the drying operation the sections or doors of the casing A are opened, when the steam will pass off from the feathers, and the evaporation thus induced and assisted by the steam-heat from pipes N will soon dry the feathers.

The device is simple in construction, cheap of production, and effective in operation.

Having described my invention, what I claim is—

1. The combination of cylinder E, pipe I, perforated pipe O, provided with flanges R around the openings therein, tubes P, and valves Q, substantially as and for the purpose set forth.

2. The combination of casing A, reticulated cylinder E, pipes I, N, and O, and their communicating tubes, the openings in pipes I and O being provided with encircling-flanges, substantially as and for the purpose set forth.

In testimony whereof I affix my signature in presence of two witnesses.

ORRIS S. CRAIN.

Witnesses:
W. SANDREYOR,
FRED. ROSENTHAL.